(12) United States Patent
Walker et al.

(10) Patent No.: US 10,013,623 B2
(45) Date of Patent: Jul. 3, 2018

(54) SYSTEM AND METHOD FOR DETERMINING THE POSITION OF AN OBJECT DISPLAYING MEDIA CONTENT

(75) Inventors: David Ryan Walker, Waterloo (CA); Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 81 days.

(21) Appl. No.: 13/538,134

(22) Filed: Jun. 29, 2012

(65) Prior Publication Data

US 2014/0003653 A1   Jan. 2, 2014

(51) Int. Cl.
*G06K 9/00* (2006.01)
*G06K 9/32* (2006.01)
*G06F 3/147* (2006.01)

(52) U.S. Cl.
CPC .......... *G06K 9/3216* (2013.01); *G06F 3/147* (2013.01); *G09G 2340/0464* (2013.01); *G09G 2340/12* (2013.01)

(58) Field of Classification Search
CPC ............................. G06K 9/3216; G06F 3/147
See application file for complete search history.

(56) References Cited

U.S. PATENT DOCUMENTS

| | | | | |
|---|---|---|---|---|
| 7,970,164 B2* | 6/2011 | Nakamura | ............ | G06T 1/0085 382/100 |
| 8,392,951 B2* | 3/2013 | Park et al. | ...................... | 725/60 |
| 2006/0086796 A1* | 4/2006 | Onogi | ................ | G06K 7/10712 235/454 |
| 2008/0259222 A1* | 10/2008 | Hardacker | ............. | H04N 5/445 348/744 |
| 2010/0001072 A1* | 1/2010 | Onogi | .................. | G06K 7/1095 235/454 |
| 2010/0220891 A1* | 9/2010 | Lefevre | ..................... | G06T 7/20 382/103 |
| 2010/0316281 A1* | 12/2010 | Lefevre | ................. | G06T 19/006 382/154 |
| 2011/0078202 A1* | 3/2011 | Kamibeppu | ....... | H04N 21/4722 707/792 |

(Continued)

FOREIGN PATENT DOCUMENTS

| | | |
|---|---|---|
| JP | 2009-111869 A | 5/2009 |
| JP | 4740092 B2 | 5/2011 |
| JP | 2011-171903 A | 9/2011 |

OTHER PUBLICATIONS

Park. N. et al.; "Barcode-Assisted Planar Object Tracking Method for Mobile Augmented Reality"; 2011 International Symposium on Ubiquitous Virtual Reality; 2011; pp. 40 to 43; IEEE Computer Society; ISBN: 978-0-7695-4420-5/11.

(Continued)

*Primary Examiner* — Gandhi Thirugnanam
(74) *Attorney, Agent, or Firm* — Jose Gutman; Fleit Gibbons Gutman Bongini & Bianco P.L.

(57) ABSTRACT

A system and method are provided for enabling a primary device to track a secondary device. The method comprises determining a frequency at which a marker is being displayed with media content on the secondary device; capturing images using the primary device at the frequency at which the marker is being displayed; and providing an output on the primary device while the marker is being displayed.

22 Claims, 8 Drawing Sheets

(56) References Cited

U.S. PATENT DOCUMENTS

| | | | | |
|---|---|---|---|---|
| 2011/0221962 | A1* | 9/2011 | Khosravy | H04N 21/4622 |
| | | | | 348/563 |
| 2012/0017236 | A1* | 1/2012 | Stafford | A63F 13/00 |
| | | | | 725/32 |
| 2012/0038668 | A1* | 2/2012 | Kim | G06F 3/011 |
| | | | | 345/633 |
| 2012/0232976 | A1* | 9/2012 | Calman | G06Q 30/02 |
| | | | | 705/14.25 |
| 2012/0233070 | A1* | 9/2012 | Calman | G06Q 20/3276 |
| | | | | 705/41 |
| 2012/0233089 | A1* | 9/2012 | Calman | G06Q 40/00 |
| | | | | 705/36 R |
| 2012/0327117 | A1* | 12/2012 | Weller et al. | 345/633 |
| 2013/0183021 | A1* | 7/2013 | Osman | H04N 9/87 |
| | | | | 386/239 |
| 2013/0218721 | A1* | 8/2013 | Borhan | G06Q 20/322 |
| | | | | 705/26.41 |
| 2014/0003653 | A1* | 1/2014 | Walker | G06K 9/3216 |
| | | | | 382/103 |
| 2015/0146925 | A1* | 5/2015 | Son | G06K 9/00624 |
| | | | | 382/103 |
| 2016/0247423 | A1* | 8/2016 | Hohl | G09F 9/3026 |

OTHER PUBLICATIONS

Celozzi, C. et al.; "Controlling Generic Visualization Environments using Handheld Devices and Natural Feature Tracking"; May 2011; pp. 848 to 857; vol. 57, No. 2; IEEE Transactions on Consumer Electronics; ISSN: 0098-3063.

Grundhofer, A. et al.; "Dynamic Adaptation of Projected Imperceptible Codes"; 2007; Proceedings of the Sixth IEEE/ACM International Symposium on Mixed and Augmented Reality, ISMAR 2007, Nov. 13 to 16, 2007, Nara, Japan; ISBN: 978-1-4244-1749-0.

Hauber, J.; Search Report from corresponding European Application No. 12174332.2; search completed Nov. 23, 2012.

European Examination Report dated Feb. 3, 2016, Received for European Application No. 12114332.2.

European Examination Report dated Sep. 30, 2016, Received for European Application No. 12174332.2.

* cited by examiner

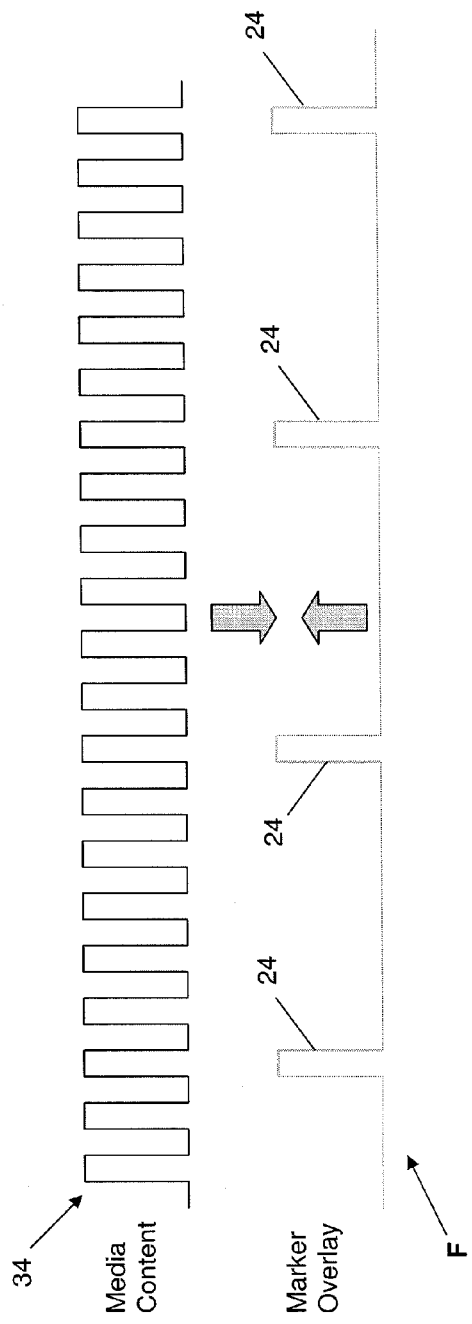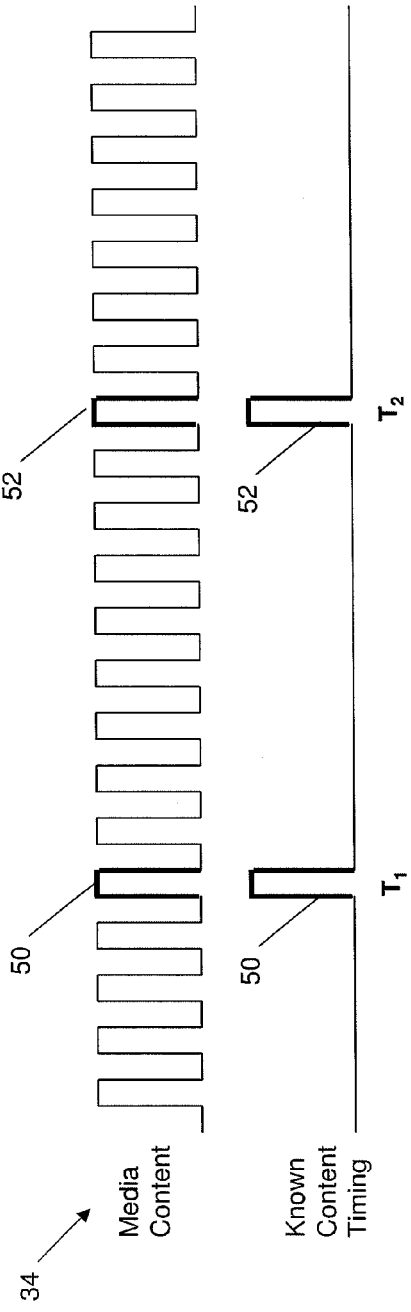

SYSTEM AND METHOD FOR DETERMINING THE POSITION OF AN OBJECT DISPLAYING MEDIA CONTENT

TECHNICAL FIELD

The following relates to systems and methods for determining the position of an object displaying media content.

DESCRIPTION OF THE RELATED ART

Portable electronic devices, such as smart phones, tablets, laptops, portable gaming devices, digital cameras, and the like, more frequently include built-in imaging devices such as cameras. These imaging devices can be used to overlay augmented reality (AR) objects on a display screen or viewer. Typically, the AR objects are meant to be overlaid in a particular position and orientation with respect to what is being viewed. For example, AR objects overlaid on a television screen or computer monitor while gaming are typically displayed such that the objects supplement what is being viewed, without obstructing what is being viewed.

In order to accurately overlay AR objects, the electronic device being used may need to recognize and track the devices displaying the content being overlaid, e.g., the location and orientation of a screen of a television or monitor. Typically, such recognition and tracking requires that a recognizable marker be placed on the device being tracked, e.g., a quick response (QR) code. However, these markers may be obtrusive, unsightly, or otherwise obstruct or interfere with the AR experience.

BRIEF DESCRIPTION OF THE DRAWINGS

Embodiments will now be described by way of example only with reference to the appended drawings wherein:

FIG. 6 shows sequence diagrams illustrating a marker overlay for media content;

FIG. 7 shows sequence diagrams illustrating recognition of markers comprising known objects within media content;

DETAILED DESCRIPTION

Figure 1:
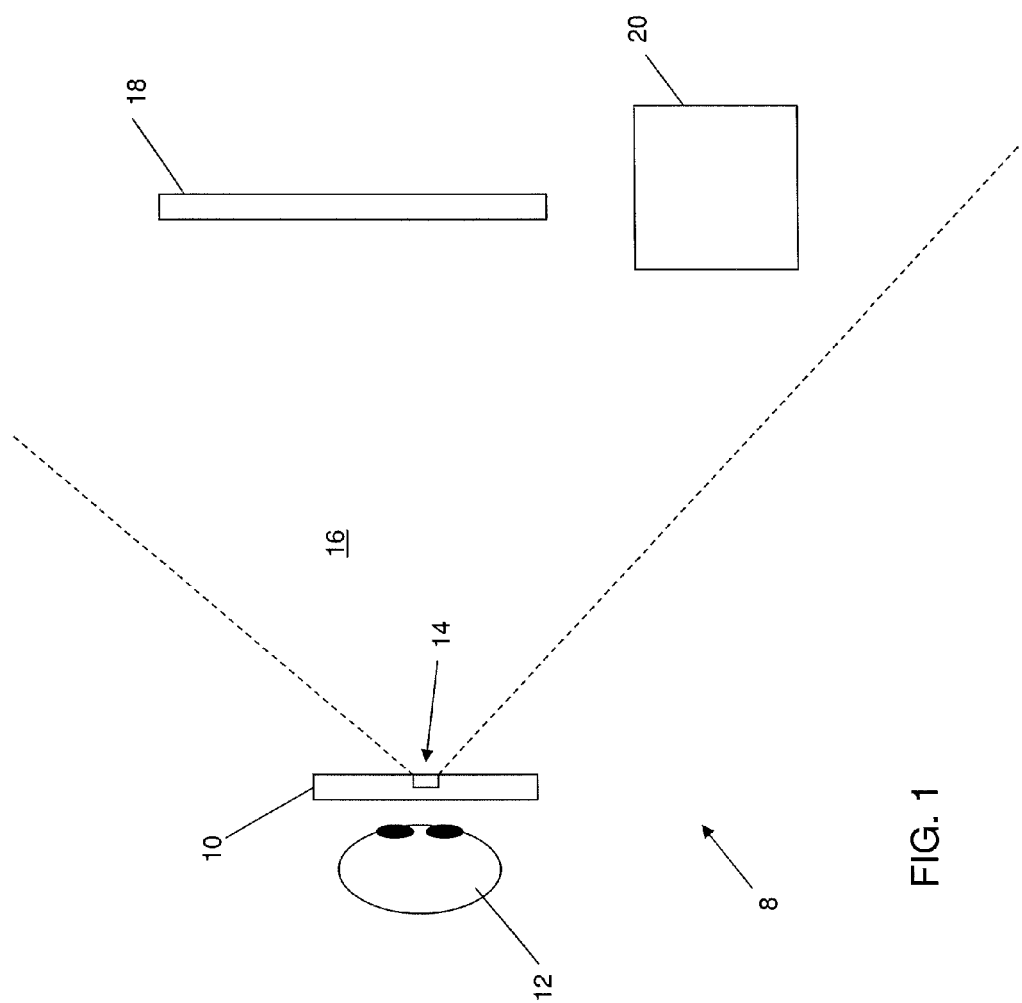
FIG. 1 is a schematic illustration of an environment in which objects are viewed using a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been found that an unobtrusive way to enable tracking of a device displaying media content, is to display a recognizable object or "marker", such as a QR code for a single frame in the media content on a periodic basis that is longer than a frame rate of the media content, e.g., by displaying the single frame every few seconds during video content. In this way, the marker can be made undetectable to the unaided eye while being detectable using an imaging device such as a camera. In order to have the object tracked, the imaging device capturing images of the media content can be synchronized to capture frames only during the frames containing the marker such that the effectively "hidden" marker is only perceived by the imaging device and thus becomes unobtrusive to the human observer.

A recognized benefit of this unobtrusive tracking is that the device displaying the media content and the device viewing the media content are not required to communicate with each other since the imaging device on the observing device can initially scan the media content to determine the frequency at which the marker is being displayed, and subsequently synchronize the imaging frequency of the imaging device accordingly.

It has also been recognized that another unobtrusive way to enable tracking of a device displaying media content, can be achieved by the device observing the media content having knowledge of what can be observed in the content. For example, the observing device may be providing the content being displayed on the observed device, such as a series of photos being shared on a television. If the observing device is providing the content, knowledge of particular markers in the content can be used to track the observed device in order to, e.g., provide an AR overlay accordingly. Similarly, the observing device may be able to recognize markers in the media content being displayed based on a particular environment, time of day, location, broadcast schedule, content matching algorithms, etc. By having a shared knowledge of the media content, pattern matching can be performed on frames containing the recognizable content to facilitate tracking the observed device.

Referring now to FIG. 1, an environment 8 is shown, in which a first or "primary" device 10 is being operated by an observer or user 12. The primary device 10 may be any suitable electronic device that can be held and operated by the user 12 in order to interact with the environment. For example, as will be described below, an imaging device 14 included in the primary device 10 can be used to observe the environment 8 within a field of view (FOV) 16 of the imaging device 14 in order to overlay AR objects onto the observed scene. In the example shown in FIG. 1, the primary device 10 has a current FOV 16 that includes a secondary device 18, and another object 20. In this example, it is assumed that the user 12 wishes to use the primary device 10 to track the location of the secondary device 18, e.g., to be able to determine what is being displayed thereby, and thus needs to distinguish between the secondary device 18 and the other object 20.

Figure 2:
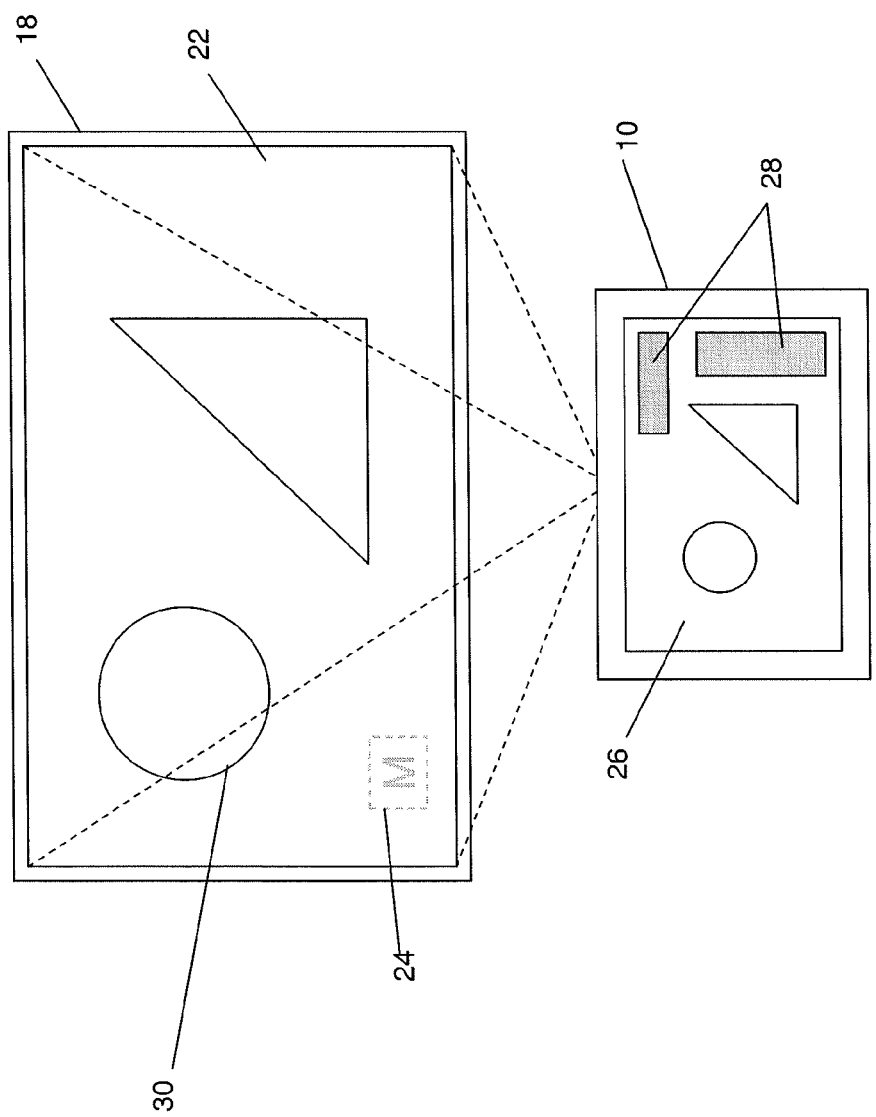
FIG. 2 is a schematic illustration of displayed media content being viewed through a mobile device.

FIG. 2 illustrates displayed content 22 on the secondary device 18, which may be observed as imaged content 26 on the primary device 10 by using the imaging device 14 to capture an image or video of the secondary device 18. In the example shown in FIG. 2, the primary device 10 overlays AR objects 28 to supplement the imaged content 26. For example, the primary device 10 and secondary device 18 may be used in a gaming environment, in which each primary device 10 is associated with a game player and the AR objects 28 used to personalize the individual game player's experience by overlaying game statistics, etc. Since the AR objects 28 are meant to be overlaid in a manner which complements but does not obstruct the imaged content 22, the primary device 10 may need to track the position of the secondary device 18, particularly when the user 12 is holding and perhaps moving the primary device 10 during use.

An unobtrusive marker 24 is shown in light dashed lines in FIG. 2. The marker 24 can be incorporated into the media content being displayed or otherwise displayed at a frequency that is substantially undetectable to the unaided eye but can be conveniently tracked by the imaging device 14, once the frequency of display of the marker 24 is determined. Depending on the application and environment 8, the frequency at which the marker 24 is displayed may be predetermined or otherwise known. Where the frequency of the marker 24 is not known, as explained in greater detail below, the imaging device 14 can be used to determine the frequency at which the marker 24 is being displayed, and capture the marker 24 thereafter to allow for object tracking of the secondary device 18. In this way, the primary device 10 can track the secondary device 18 without having to communicate with the secondary device 18.

The displayed content 22 may also have recognizable content 30, either due to the primary device 10 having knowledge of the recognizable content 30 or the recognizable content 30 being determinable through various metrics. With such knowledge, the primary device 10 may also track the secondary object 18.

Figure 3:
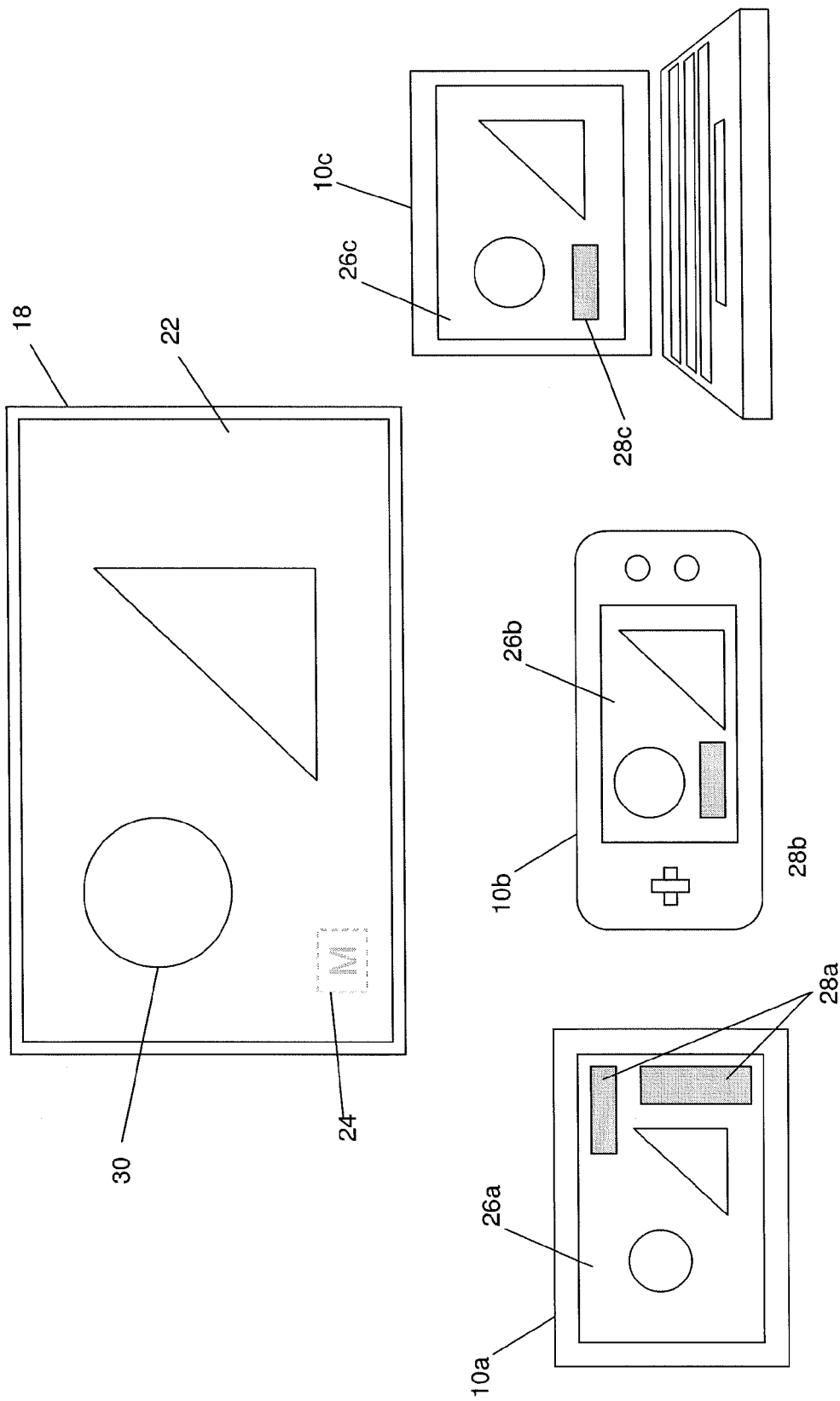
FIG. 3 is a schematic illustration of displayed media content being viewed through a plurality of different types of electronic devices.

The marker 24 and/or recognizable object(s) 30 can be used not only for a single primary device 10 to track a single secondary device 18, but also for multiple primary devices 10a, 10b, 10c to track the same secondary device 18 as shown in FIG. 3. As shown in FIG. 3, each primary device 10a, 10b, 10c is able to track the secondary object 18 using either the marker 24, the recognizable object 30 or both, and overlay personalized AR objects 28a, 28b, 28c respectively. FIG. 3 also illustrates that the principles discussed herein may be utilized by various types of electronic devices whether portable, handheld, mobile, non-portable, semi-portable, etc.

Figure 4:
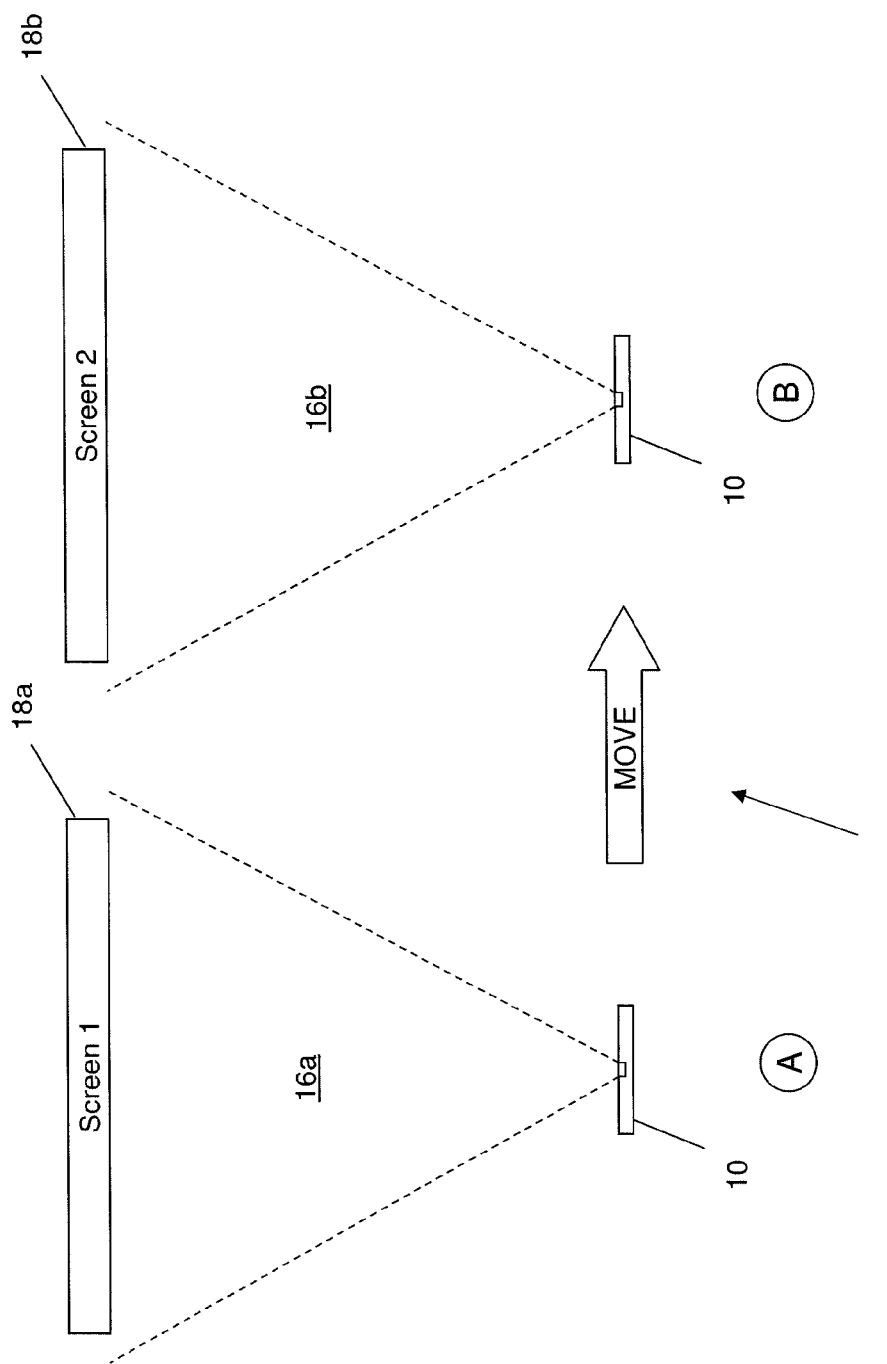
FIG. 4 is a schematic illustration of multiple display screens being viewed through a mobile device.

In addition to enabling multiple primary devices 10 to track the same secondary device 18, the marker 24 and recognizable object(s) 30 also enable a primary device 10 to track and distinguish between multiple secondary devices 18a, 18b in the same environment 8' as shown in FIG. 4. In the example shown in FIG. 4, the primary device 10 may track a first secondary device 18a within a first FOV 16a at stage A, and by moving (leftwise in the figure), a second FOV 16b can capture a second secondary device 18b at stage B. By using different markers 24 with the content being displayed by each secondary device 18a, 18b, or by being able to determine different recognizable objects 30 in respective secondary devices 18a, 18b, as the primary device 10 moves about the environment 8', different interactions with different secondary devices 18a, 18b can be achieved. For example, different AR objects 28 may be displayed overlaying the different secondary devices 18a, 18b to provide customized content for the corresponding displayed content.

Figure 5:
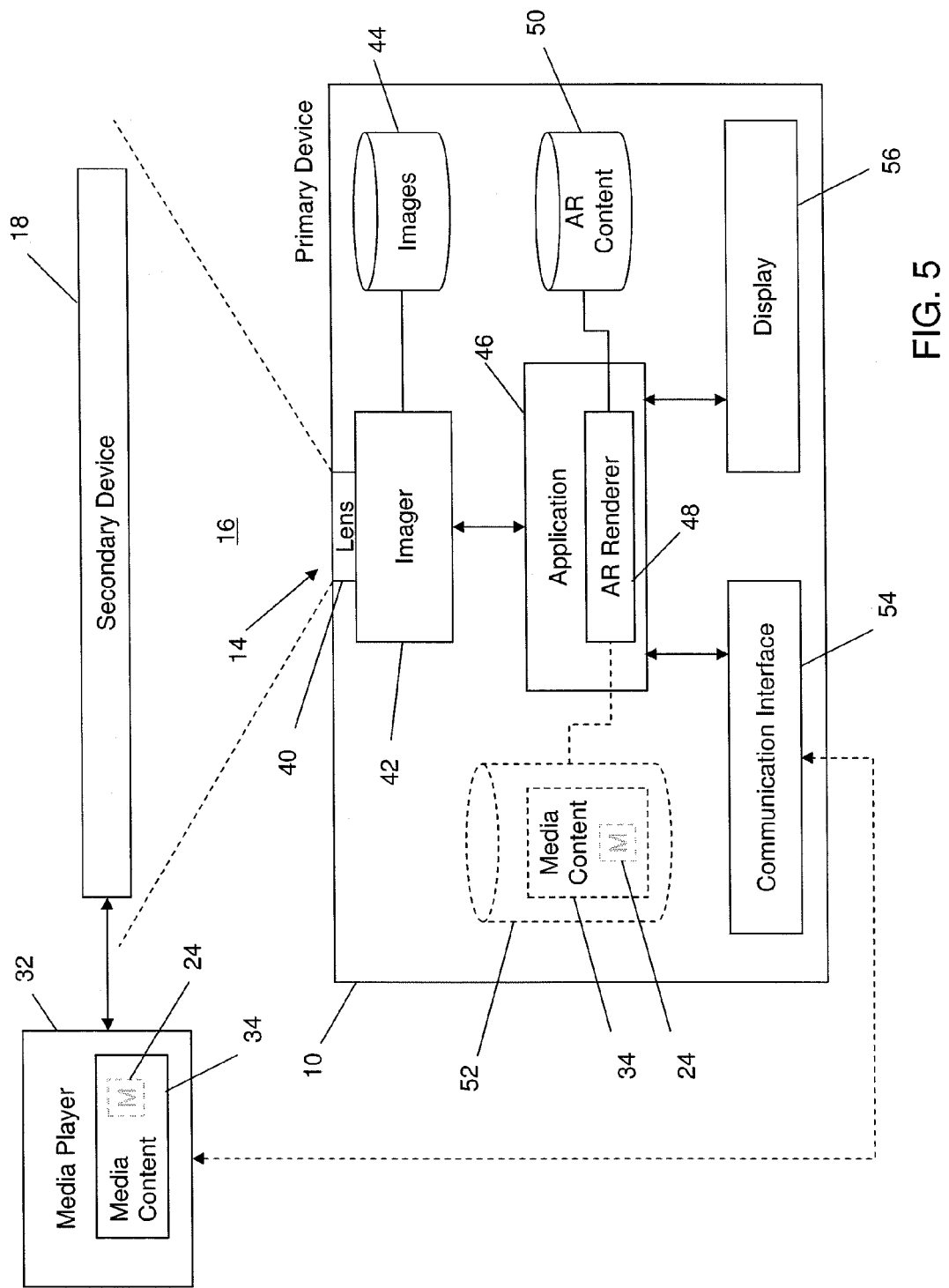
FIG. 5 is a block diagram illustrating an example of a configuration for a mobile device having an imaging device.

FIG. 5 illustrates an example of a configuration for the primary device 10. It can be appreciated that the configuration shown in FIG. 5 is for illustrative purposes only and various components may be omitted for ease of explanation. Furthermore, the separation between components and/or representative elements shown in FIG. 5 is also for illustrative purposes only. As shown in FIG. 5, the imaging device 14 may comprise a lens 40 through which a user 12 can observe the content being displayed on the secondary device 18. The lens 40 enables frames to be imaged and an imager 42 (e.g., camera device and/or software) can process the frames being captured by the lens 40 as images, video, or both. The imager 42 includes or otherwise has access to a memory or storage element for storing images 44.

An application 46 utilizes the imaging device 14 to track the secondary device 18 and includes or otherwise has access to an AR renderer 48 which, is provided in this example to illustrate a purpose for tracking the secondary device 18, namely to determine the positioning and, possibly, the type of AR content 50 that to overlay on the content being displayed by the secondary device 18. The application 46 and AR renderer 48 may access a display 56 of the primary device 10 for rendering images and/or user interface elements on a viewable screen. The application 46 and AR renderer 48 may also utilize a communication interface 54 to, for example, communicate with a media player 32 or the secondary device 18 itself.

The media player 32 is shown separately in FIG. 5 for illustrative purposes only and may also be an integral component of the secondary device 18 or the primary device 10 (e.g., if the primary device 10 is configured to display media content 34 on the secondary device 18). The media player 32 represents any hardware, software, or combination thereof that is capable of rendering, displaying, or otherwise "playing" media content 34 on the secondary device 18. Properties of the media content 34 are used by the primary device 10 in order to track the secondary device 18. In one aspect, a marker 24 may be embedded in or combined with the media content 34, either prior to be displayed or at the time of being displayed. In another example (not shown), the media content 34 may itself include recognizable objects 30 that can be used by the primary device 10 track the secondary device 18.

As shown in dashed lines in FIG. 5, the primary device 10 may also include a memory or other media storage 52 for storing the media content 34. For example, as discussed above, the primary device 10 may, using the communication interface 54, stream or otherwise send the media content 34 to the secondary device 18. Whether the primary device 10, the secondary device 18, or an independent media player 32 is used to display the media content 34 on the secondary device 18, either the marker 24 or recognizable objects 30 may be used by the primary device 10 to track the secondary device 18 according to the nature of the media content 34 and the information available to the primary device 10. It can be appreciated that the media player 32 may be operable to display both media content 34 that includes or can be overlaid with the marker 24, and media content 34 which contains recognizable objects 30 or has been provided by the primary device 10.

FIG. 6 illustrates an example of a stream of frames of media content 34 that may be overlaid with the marker 24, which has a frequency that is less than the frame rate of the media content 34. As illustrated, the marker 24 may be embedded into the media content 34, i.e., incorporated into the media content 34 itself, or may be overlaid as the media content 34 is being displayed. By providing the marker 24 at a frequency that is undetectable to the unaided eye, the marker 24 should not be obtrusive or obstruct the media content 34 but can be tracked by enabling the imaging device 14 to capture frames at the same frequency.

FIG. 7 illustrates that known content timing can also be relied upon to track the secondary device 18. For example, as shown in FIG. 7, a first recognizable object 50 may be known to be displayed at $T_1$ and a second recognizable object 50 may be known to be displayed at $T_2$. As illustrated in darkened lines, the recognizable objects 50, 52 are integral to the media content 34 and the knowledge or detectability of the objects 50, 52 (e.g., by knowing the timing of such objects 50, 52) can be used by the primary device 10 to track the secondary device 18 without having to alter the media content 34. By knowing what the objects 50, 52 look like and, possibly, when those objects 50, 52 are likely to be displayed, the primary device 10 can apply a pattern matching or recognition algorithm or perform other suitable analytics to confirm that the objects 50, 52 have been detected.

It can be appreciated that the timing of the objects 50, 52 may not be known apriori to the primary device 10. For example, the primary device 10 may rely on an identifier or other information concerning the media content 34 to then request a broadcast schedule or other data from an external source (e.g., by accessing a website). Such other information may include, without limitation, the location of the secondary device 18, time of day, nature of environment 8, 8', a broadcast schedule associated with the media content 34 (e.g., available from an external source), content matching of known media programming, etc.

Figure 8:
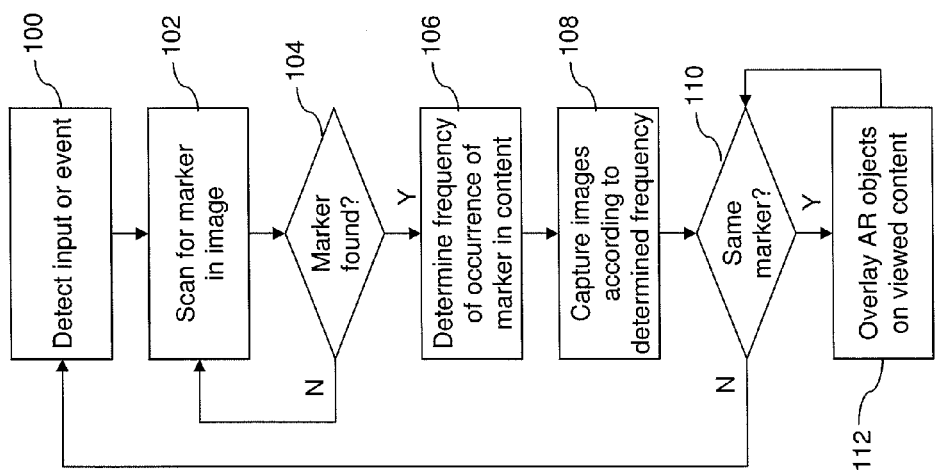
FIG. 8 is a flow chart illustrating an example of a set of computer executable operations that may be performed in determining the location of a display using a marker displayed in media content according to a particular frequency.

FIG. 8 illustrates an example set of computer executable operations that may be performed by the primary device 10 in tracking a secondary device 18 by scanning for a marker 24. At 100 the primary device 10 detects an input or other event that causes the imaging device 14 and/or application 26 to begin tracking potential secondary devices 18. The imaging device 14 captures images and scans those images for markers 24 at 102 and determines at 104 whether or not a marker 24 can be found. If not, the imaging device 14 may continue scanning at 102. If a marker 24 is found in at least one image, the imaging device 14 or application 26 determines at 106 the frequency that the marker 24 occurs in the displayed content 22. Once the frequency of the marker 24 is determined, the imaging device 14 may then be instructed at 108 to capture images at that frequency in order to confirm that the primary device 10 is still viewing the secondary device 18. This may be done by confirming at 110 whether or not the same marker 24 is being imaged. If not, the tracking process may end until the next input or event is detected at 100. A different marker 24 may be determined at 110, for example, if the primary device 10 has moved and begins imaging a second secondary device 18b as shown in FIG. 3. In such a scenario, the primary device 10 may begin scanning for the new marker 24 at 102 to then determine a new frequency (if applicable) at which to track the new marker 24. At 110, the primary device 10 may also determine that no marker 24 can be found at all, e.g., indicating that the primary device 10 can no longer locate the secondary device 18 using the imaging device 14. In such cases, the tracking may end or a notification may alert the user 12 that tracking cannot continue. The notifications may include audible, visual, tactile or other alerts that notify the user 12 of incorrect or absence of tracking. For example, the primary device 10 may be positioned incorrectly, the primary device 10 may have moved, or the secondary device 18 may have moved.

If the marker 24 is consistently tracked at 110, in this example, the AR objects 28 are overlaid on the viewed content at 112. It can be appreciated that different and/or additional enhancements may be output by the primary device 10 at 112. For example, the primary device 10 may be instructed to play a particular audio file when a particular secondary device 18 is being tracked. As such, it can be appreciated that the overlay of AR objects 30 in order to enhance what is being viewed on the secondary device 18 is only one representative output that may be provided by or on the primary device 10 while the marker 24 is being displayed.

Figure 9:
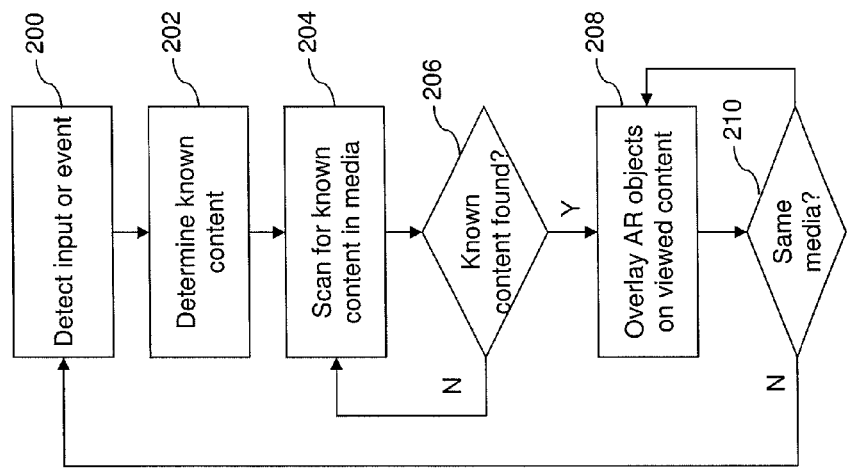
FIG. 9 is a flow chart illustrating an example of a set of computer executable operations that may be performed in determining the location of display using known objects displayed in media content.

FIG. 9 illustrates an example set of computer executable operations that may be performed by the primary device 10 in tracking a secondary device 18 using detectable, recognizable or determinable content, e.g., the recognizable objects 30 shown in FIGS. 1 and 2. At 200 the primary device 10 detects an input or event that triggers the commencement of the tracking. For example, if the primary device 10 is providing the media content 34 to the secondary device 18 to be displayed, this may correspond to an event detected at 200. The application 26 in this example determines the known content at 202, using information available to the primary device 10. For example, the nature of the content or information related thereto may be accessed by the application 26 using the communication interface 54, the application 26 may use metadata or other information associated with media content 34 stored on the primary device 10, etc. With this information, the primary device 10 may then scan or otherwise check for known content in images captured by the imager 42 at 204 and determine at 206 whether or not the known content can be found. If not, the primary device 10 may continue to scan at 204. Once the known content has been found at 206, in this example, the AR objects 28 are overlaid on the displayed content 26 as shown in FIGS. 2 and 3. The application 26 determines at 210 whether or not the same content is being displayed, e.g., by continuing to scan for known content or by referencing other criteria such as time of day, location of secondary device 18, broadcast schedule, etc. If the same content is being displayed, the AR objects 28 may continue to be overlaid at 208. If the same content is not being displayed, the tracking may end until the next input or event is detected at 200.

It can be appreciated that different and/or additional enhancements may be output by the primary device 10 at 208. For example, the primary device 10 may be instructed to play a particular audio file when a particular secondary device 18 is being tracked. As such, it can be appreciated that the overlay of AR objects 30 in order to enhance what is being viewed on the secondary device 18 is only one representative example.

Accordingly, in one aspect, there is provided a method of a primary device tracking a secondary device, the method comprising: determining a frequency at which a marker is being displayed with media content on the secondary device; capturing images using the primary device at the frequency at which the marker is being displayed; and providing an output on the primary device while the marker is being displayed.

In another aspect, there is provided an electronic device comprising a processor, memory, a display, and an imaging device, the memory comprising computer executable instructions for causing the processor to: determine a frequency at which a marker is being displayed with media content on a secondary device; use the imaging device to capturing images using the primary device at the frequency at which the marker is being displayed; and provide an output on the display while the marker is being displayed.

In yet another aspect, there is provided a computer readable storage medium comprising computer executable instructions for a primary device to track a secondary device, the computer executable instructions comprising instructions for: determining a frequency at which a marker is being displayed with media content on the secondary device; capturing images using the primary device at the frequency at which the marker is being displayed; and providing an output on the primary device while the marker is being displayed.

Figure 10:
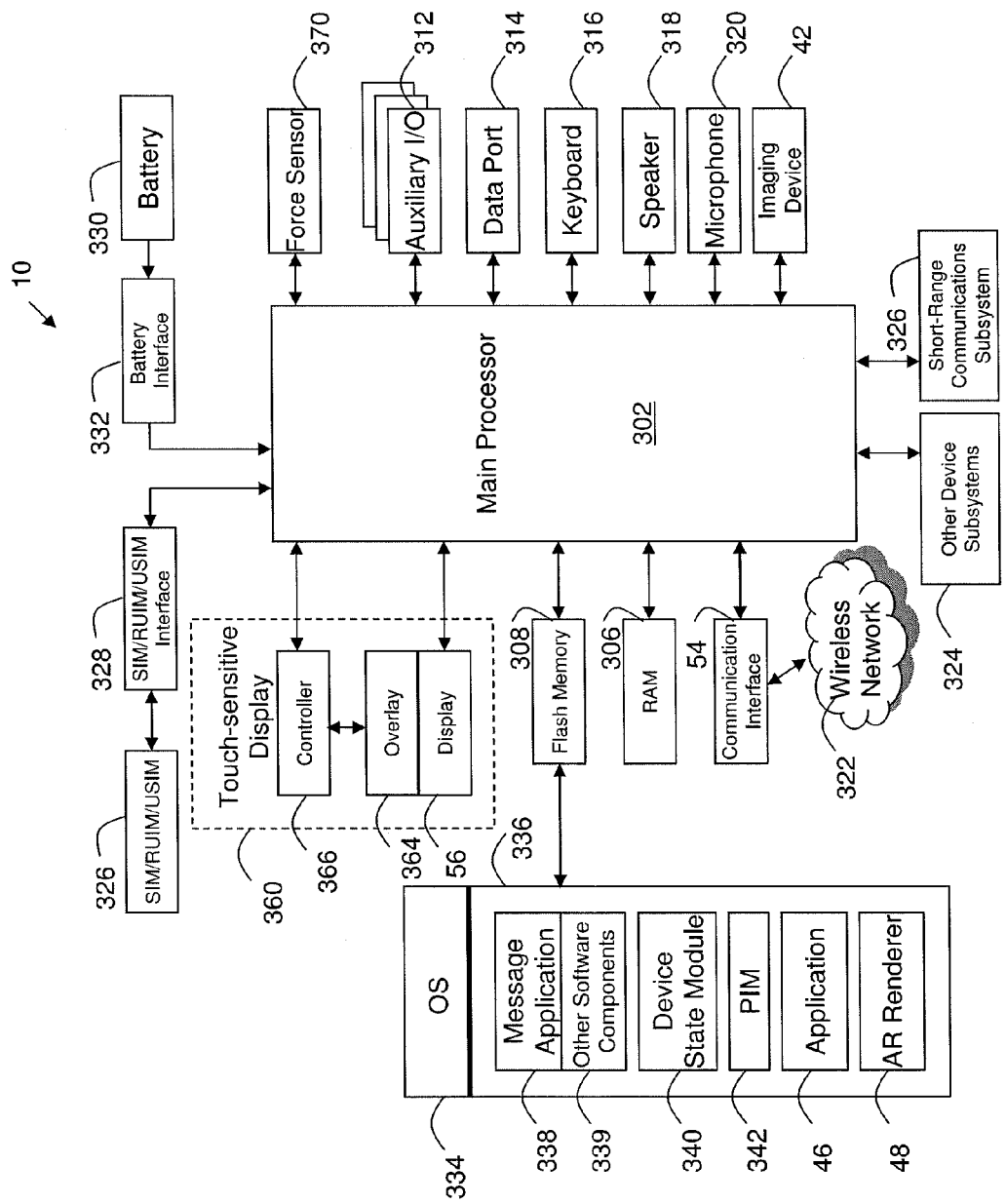
FIG. 10 is a block diagram illustrating an example of a configuration for a mobile device.

Referring to FIG. 10, to further aid in the understanding of the example mobile devices 10 described above, shown therein is a block diagram of an example configuration a mobile device 10. The mobile device 10 includes a number of components such as a main processor 302 that controls the overall operation of the mobile device 10. Communication functions, including data and voice communications, are performed through a communication interface 54. The communication interface 54 receives messages from and sends messages to a wireless network 322. In this example of the mobile device 10, the communication interface 54 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 54 with the wireless network 322 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, an imaging device 42, short-range communications subsystem 326, and other device subsystems 324. Some of the subsystems of the mobile device 10 perform communication-related functions, whereas other subsystems may provide "resident" or on-device functions. By way of example, a display 56 and the keyboard 316 may be used for both communication-related functions, such as entering a text message for transmission over the wireless network 322, and device-resident functions such as a calculator or task list. In one example, the mobile device 10 can include a non touch-sensitive display in place of, or in addition to the touch-sensitive display 360. For example the touch-sensitive display 360 can be replaced by a display 56 that may not have touch-sensitive capabilities.

The mobile device 10 can send and receive communication signals over the wireless network 322 after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 46, and 48. The operating system 334 and the software components 336 to 342, 46, and 48, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 46, and 48, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, the application 46, and the AR renderer 48. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 322.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 322, the auxiliary I/O subsystem 312, the data port 314, the short-range communications subsystem 326, or any other suitable device subsystem 324.

The data port 314 can be any suitable port that enables data communication between the mobile device 10 and another computing device. The data port 314 can be a serial or a parallel port. In some instances, the data port 314 can be a USB port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 56 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 56 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance traveled, the duration, the velocity, and the direction, for example. A gesture may be long or short in distance and long or short in duration. Two points of the gesture may be utilized to determine a direction of the gesture.

An example of a gesture is a swipe (also known as a "flick"). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to one or more of force measurements, estimates, and calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 or media player 34, any component of or related to the mobile device 10 or media player 34, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method, in an environment constituted by a primary device and a secondary device, for the primary device to track the secondary device in the environment and for the primary device to display an augmented reality object associated with the secondary device, the method comprising:
   capturing, with an imaging device of the primary device, images of the environment including at least the secondary device displaying media content including an unobtrusive marker, the unobtrusive marker being displayed by the secondary device periodically in a frame, in a stream of frames of the media content, at a frequency that is less than a frame rate of the media content such that the unobtrusive marker is displayed undetectable to an unaided eye while being detectable by the primary device with the imaging device of the primary device;
   scanning, with the primary device for displaying an augmented reality object on a display of the primary device, the captured images of the environment containing the secondary device displaying the media content, to detect an occurrence of the unobtrusive marker in the media content and to determine the frequency that the unobtrusive marker is displayed in the media content, and without scanning to detect in the scanned captured images an occurrence of a recognizable object in the media content detectable to an unaided eye;
   determining, with the primary device, from the scanned captured images that the unobtrusive marker is being displayed in the media content at the frequency;
   tracking, by the primary device, a location of the secondary device in the captured images of the environment based on determination that the unobtrusive marker is being displayed in the media content at the frequency; and
   providing, in response to the determination, an output on the primary device based on detecting in the captured images the unobtrusive marker in the media content displayed by the secondary device being tracked by the primary device, the output comprising display, on the display of the primary device, of the captured images of the environment including at least one augmented reality object overlaying the media content displayed by the secondary device.

2. The method of claim 1, the media content comprising a video, the unobtrusive marker being displayed in at least one frame of the video.

3. The method of claim 1, the at least one augmented reality object being personalized to a user of the primary device.

4. The method of claim 1, further comprising the primary device:
   determining, based on one or more images of the environment captured with the imaging device of the primary device, that the unobtrusive marker is no longer being displayed in the media content at the frequency;
   detecting, within one or more images of the environment being captured with the imaging device, a second unobtrusive marker integral to different media content being displayed by another secondary device, the second unobtrusive marker displayed periodically in a frame, in a stream of frames of the displayed different media content, at a second frequency that is less than a frame rate of the different media content such that the second unobtrusive marker is displayed undetectable to an unaided eye while being detectable by the primary device with an imaging device of the primary device;
   scanning, with the primary device, the one or more captured images of the environment containing the another secondary device displaying the different media content, to detect occurrence of the second unobtrusive marker in the different media content and to determine a second frequency that the second unobtrusive marker is displayed in the different media content, and without scanning to detect in the scanned captured images an occurrence of a recognizable object in the different media content detectable to an unaided eye;
   determining, with the primary device, from the one or more scanned captured images that the second unobtrusive marker is being displayed in the different media content at the second frequency;
   tracking, by the primary device, a location of the another secondary device in the captured images of the environment based on the determining that the second unobtrusive marker is being displayed in the different media content at the second frequency; and
   providing, in response to the determining that the second unobtrusive marker is being displayed at the second frequency, another output on the primary device based on detecting within the one or more captured images the second unobtrusive marker integral to the different media content being displayed by the another secondary device, the another output comprising display, on the display of the primary device, of the captured images of the environment including a second augmented reality object overlaying the different media content displayed by the another secondary device.

5. The method of claim 1, wherein the media content being displayed on the secondary device is previously known to the primary device.

6. The method of claim 1, further comprising the primary device:
identifying information in the media content being displayed; and
requesting data from an external source to determine a timing of display frequency of the unobtrusive marker in the media content.

7. The method of claim 5, wherein the media content including the at least one recognizable object comprising the unobtrusive marker being displayed by the secondary device is being provided to the secondary device by the primary device.

8. The method of claim 1, further comprising the primary device applying analytics to confirm that the at least one recognizable object has been detected.

9. The method of claim 4, wherein the detected second unobtrusive marker integral to the different media content is different than the unobtrusive marker in the media content, and wherein the providing the another output comprises:
displaying on the display of the primary device another augmented reality object overlaying a representation of the media content displayed by the another secondary device and captured by the imaging device of the primary device, the displayed another augmented reality object being
customized to the different media content displayed by the another secondary device, and
different than the displayed augmented reality object overlaying a representation of the media content displayed by the secondary device and captured by the imaging device of the primary device.

10. The method of claim 1, wherein the providing an output comprises:
providing a first output on the primary device while periodically detecting in the captured images the at least one recognizable object comprising the unobtrusive marker in the media content displayed by the secondary device.

11. The method of claim 10, wherein the output on the primary device comprises the first output and a second output, different from the first output, and the providing an output further comprising:
providing the second output on the primary device in response to the primary device no longer periodically detecting in the captured images the at least one recognizable object comprising the unobtrusive marker in the media content displayed by the secondary device.

12. The method of claim 1, wherein the providing the output comprises:
displaying the augmented reality object in a location and orientation such that the augmented reality object accurately and unobstructively overlays the media content displayed by the secondary device while the tracked location of the secondary device displaying the media content moves in the displayed captured images.

13. A primary electronic device comprising a processor, memory, a display, and an imaging device, the memory comprising computer executable instructions for causing the processor to:

capture, with the imaging device of the primary electronic device, images of an environment including the primary electronic device and at least a secondary device displaying media content including an unobtrusive marker, the unobtrusive marker being displayed by the secondary device periodically in a frame, in a stream of frames of the media content, at a frequency that is less than a frame rate of the media content such that the unobtrusive marker is displayed undetectable to an unaided eye while being detectable by the primary device with the imaging device of the primary device;
scan, with the primary device for displaying an augmented reality object on a display of the primary device, the captured images of the environment containing the secondary device displaying the media content, to detect an occurrence of the unobtrusive marker in the media content and to determine the frequency that the unobtrusive marker is displayed in the media content, and without scanning to detect in the scanned captured images an occurrence of a recognizable object in the media content detectable to an unaided eye;
determine, with the primary device, from the scanned captured images that the unobtrusive marker is being displayed in the media content at the frequency;
track, by the primary device, a location of the secondary device in the captured images of the environment based on determination that the unobtrusive marker is being displayed in the media content at the frequency; and
provide, in response to the determination, an output on the primary electronic device based on detecting in the captured images the unobtrusive marker in the media content displayed by the secondary device, the output comprising display, on the display of the primary device, of the captured images of the environment including at least one augmented reality object overlaying the media content displayed by the secondary device.

14. The non-transitory computer readable storage medium of claim 13, the media content comprising a video, the unobtrusive marker being displayed in at least one frame of the video.

15. A non-transitory computer readable storage medium comprising computer executable instructions for:
capturing, with an imaging device of a primary device, images of an environment, the environment constituted by the primary device and at least a secondary device, the captured images of the environment including at least the secondary device displaying media content including an unobtrusive marker displayed by the secondary device periodically in a frame, in a stream of frames of the media content, at a frequency that is less than a frame rate of the media content such that the unobtrusive marker is displayed undetectable to an unaided eye while being detectable by the primary device with the imaging device of the primary device;
scanning, with the primary device for displaying an augmented reality object on a display of the primary device, the captured images of the environment containing the secondary device displaying the media content, to detect an occurrence of the unobtrusive marker in the media content and to determine the frequency that the unobtrusive marker is displayed in the media content, and without scanning to detect in the scanned captured images an occurrence of a recognizable object in the media content detectable to an unaided eye;

determining, with the primary device, from the scanned captured images that the unobtrusive marker is being displayed in the media content at the frequency;

tracking, by the primary device, a location of the secondary device in the captured images of the environment based on determination that the unobtrusive marker is being displayed in the media content at the frequency; and providing, in response to the determination, an output on the primary device based on detecting in the captured images the unobtrusive marker in the media content displayed by the secondary device, the output comprising display, on the display of the primary device, of the captured images of the environment including at least one augmented reality object overlaying the media content displayed by the secondary device.

16. The non-transitory computer readable storage medium of claim 15, the at least one augmented reality object being personalized to a user of the primary device.

17. The non-transitory computer readable storage medium of claim 15, further comprising instructions for causing the processor to:

determine, based on one or more images of the environment captured with the imaging device of the primary device, that the unobtrusive marker is no longer being displayed in the media content at the frequency;

detect, within one or more images of the environment being captured with the imaging device, a second unobtrusive marker integral to different media content being displayed by another secondary device, the second unobtrusive marker displayed periodically in a frame, in a stream of frames of the displayed different media content, at a second frequency that is less than a frame rate of the different media content such that the second unobtrusive marker is displayed undetectable to an unaided eye while being detectable by the primary device with the imaging device of the primary device;

scanning, with the primary device, the one or more captured images of the environment containing the another secondary device displaying the different media content, to detect occurrence of the second unobtrusive marker in the different media content and to determine the second frequency that the second unobtrusive marker is displayed in the different media content, and without scanning to detect in the scanned captured images an occurrence of a recognizable object in the different media content detectable to an unaided eye;

determine, with the primary device, from the one or more scanned captured images that the second unobtrusive marker is being displayed in the different media content at the second frequency;

tracking, by the primary device, a location of the another secondary device in the captured images of the environment based on the determining that the second unobtrusive marker is being displayed in the different media content at the second frequency; and provide, in response to the determining that the second unobtrusive marker is being displayed at the second frequency, another output on the primary device based on detecting within the one or more captured images the second unobtrusive marker integral to the different media content being displayed by the another secondary device, the another output comprising display, on the display of the primary device, of the captured images of the environment including a second augmented reality object overlaying the different media content displayed by the another secondary device.

18. The non-transitory computer readable storage medium of claim 15, wherein the media content being displayed on the secondary device is previously known to the primary device.

19. The non-transitory computer readable storage medium of claim 15, further comprising instructions for causing the processor to:

identify information in the media content being displayed; and request data from an external source to determine a timing of display frequency of the unobtrusive marker in the media content.

20. The non-transitory computer readable storage medium of claim 18, wherein the media content including the at least one recognizable object comprising the unobtrusive marker being displayed by the secondary device is being provided to the secondary device by the primary device.

21. The non-transitory computer readable storage medium of claim 15, further comprising instructions for causing the processor to apply analytics to confirm that the at least one recognizable object has been detected.

22. The non-transitory computer readable storage medium of claim 17, wherein the detected second unobtrusive marker integral to the different media content is different than the unobtrusive marker in the media content, and wherein the non-transitory computer readable storage medium further comprising instructions for causing the processor to:

display on the display of the primary device another augmented reality object overlaying a representation of the media content displayed by the another secondary device and captured by the imaging device of the primary device, the displayed another augmented reality object being customized to the different media content displayed by the another secondary device, and different than the displayed augmented reality object overlaying a representation of the media content displayed by the secondary device and captured by the imaging device of the primary device.

* * * * *